(12) United States Patent
Zhang et al.

(10) Patent No.: US 11,928,826 B2
(45) Date of Patent: *Mar. 12, 2024

(54) ENHANCED OPTICAL FLOW ESTIMATION USING A VARIED SCAN ORDER

(71) Applicant: NVIDIA Corporation, Santa Clara, CA (US)

(72) Inventors: Dong Zhang, Hangzhou (CN); Jianjun Chen, Shanghai (CN); Manindra Parhy, Fremont, CA (US)

(73) Assignee: NVIDIA Corporation, Santa Clara, CA (US)

( * ) Notice: Subject to any disclaimer, the term of this patent is extended or adjusted under 35 U.S.C. 154(b) by 32 days.

This patent is subject to a terminal disclaimer.

(21) Appl. No.: 17/526,750

(22) Filed: Nov. 15, 2021

(65) Prior Publication Data

US 2022/0076429 A1     Mar. 10, 2022

Related U.S. Application Data

(63) Continuation of application No. 16/698,021, filed on Nov. 27, 2019, now Pat. No. 11,176,682.

(51) Int. Cl.
| | |
|---|---|
| *G06K 9/00* | (2022.01) |
| *G06T 3/60* | (2006.01) |
| *G06T 7/207* | (2017.01) |
| *G06T 7/269* | (2017.01) |

(52) U.S. Cl.
CPC ............... *G06T 7/207* (2017.01); *G06T 3/60* (2013.01); *G06T 7/269* (2017.01); *G06T 2207/20016* (2013.01); *G06T 2207/20216* (2013.01)

(58) Field of Classification Search
CPC .......... G06T 7/207; G06T 3/60; G06T 7/269; G06T 2207/20016; G06T 2207/20216
See application file for complete search history.

(56) References Cited

U.S. PATENT DOCUMENTS

| | | | | |
|---|---|---|---|---|
| 5,559,695 A | * | 9/1996 | Daily ..................... | G01S 11/12 701/1 |
| RE35,456 E | * | 2/1997 | Yassa ..................... | H05G 1/60 378/98.2 |

(Continued)

OTHER PUBLICATIONS

Hu, Y., et al., "Efficient Coarse-to-Fine PatchMatch for Large Displacement Optical Flow", Proceedings of the IEEE Conference on Computer Vision and Pattern Recognition, pp. 1-10 (Jun. 2016).

*Primary Examiner* — Shervin K Nakhjavan
(74) *Attorney, Agent, or Firm* — Taylor English Duma L.L.P.

(57) ABSTRACT

In various examples, optical flow estimate (OFE) quality is improved when employing a hint-based algorithm in multi-level hierarchical motion estimation by using different scan orders at different resolution levels. A scan of an image performed with a scan order may initially leverage OFEs from a previous scan of the image, where the previous scan was performed using a different scan order. The OFEs leveraged from the previous scan are more likely to be of high accuracy until sufficient spatial hints are available to the hint-based algorithm for the scan to reduce the impact of potentially lower quality OFEs resulting from the different scan order of the previous scan.

20 Claims, 10 Drawing Sheets

(56) References Cited

U.S. PATENT DOCUMENTS

| | | | | |
|---|---|---|---|---|
| 5,611,000 | A * | 3/1997 | Szeliski | G06T 7/269 382/294 |
| 11,288,838 | B2 * | 3/2022 | Ma | G06T 7/277 |
| 11,483,480 | B2 * | 10/2022 | Dolan | H04N 25/57 |
| 11,563,932 | B2 * | 1/2023 | Haskin | H04N 5/265 |
| 2010/0149183 | A1 * | 6/2010 | Loewke | G06V 20/693 345/424 |
| 2010/0165206 | A1 * | 7/2010 | Nestares | G06T 5/50 348/607 |
| 2011/0026596 | A1 * | 2/2011 | Hong | H04N 5/145 375/E7.123 |
| 2011/0043604 | A1 * | 2/2011 | Peleg | G06T 3/4038 348/E7.001 |
| 2011/0286635 | A1 * | 11/2011 | Nishigaki | G06T 7/248 382/107 |
| 2011/0311099 | A1 * | 12/2011 | Derbanne | G06T 7/207 382/103 |
| 2012/0075535 | A1 * | 3/2012 | Van Beek | H04N 5/145 348/E5.062 |
| 2013/0070121 | A1 * | 3/2013 | Gu | H04N 25/76 348/241 |
| 2013/0259317 | A1 * | 10/2013 | Gaddy | G06T 7/269 382/107 |
| 2015/0234045 | A1 * | 8/2015 | Rosenblum | G01S 13/931 342/70 |
| 2015/0269449 | A1 * | 9/2015 | Kosaki | G06V 20/58 382/103 |
| 2015/0365696 | A1 * | 12/2015 | Garud | H04N 19/53 375/240.16 |
| 2017/0161565 | A1 * | 6/2017 | Garud | G06T 7/207 |
| 2018/0089838 | A1 * | 3/2018 | Li | G06T 7/269 |
| 2018/0239973 | A1 * | 8/2018 | Bovyrin | G06V 20/56 |
| 2018/0247423 | A1 * | 8/2018 | Suzuki | G06T 5/50 |
| 2018/0293737 | A1 * | 10/2018 | Sun | G06T 7/207 |
| 2018/0324465 | A1 * | 11/2018 | Aydin | H04N 19/51 |
| 2018/0333123 | A1 * | 11/2018 | Wang | A61B 6/507 |
| 2019/0026902 | A1 * | 1/2019 | Kiyamura | G06T 7/0002 |
| 2019/0033336 | A1 * | 1/2019 | Remond | G06T 7/207 |
| 2019/0050998 | A1 * | 2/2019 | Kirby | H04N 13/239 |
| 2019/0139205 | A1 * | 5/2019 | El-Khamy | G06F 18/214 |
| 2019/0362505 | A1 * | 11/2019 | Kobayashi | G06T 3/40 |
| 2020/0027219 | A1 * | 1/2020 | Sanghvi | G06T 7/251 |
| 2020/0074192 | A1 * | 3/2020 | Ogata | G08G 1/16 |
| 2020/0118245 | A1 * | 4/2020 | Gao | G06T 7/0002 |
| 2020/0154131 | A1 * | 5/2020 | Iyer | H04N 5/33 |
| 2020/0184655 | A1 * | 6/2020 | Xiang | H04N 23/64 |
| 2020/0226781 | A1 * | 7/2020 | Ma | G06T 7/33 |
| 2021/0056711 | A1 * | 2/2021 | Tanabe | G06T 7/215 |
| 2021/0192737 | A1 * | 6/2021 | Zhou | G06T 7/248 |
| 2021/0290052 | A1 * | 9/2021 | Faini | A61B 5/7207 |
| 2022/0092795 | A1 * | 3/2022 | Liu | G06T 7/269 |
| 2022/0156958 | A1 * | 5/2022 | Oka | G06T 7/269 |
| 2022/0277592 | A1 * | 9/2022 | Hosono | G06T 7/38 |
| 2022/0327716 | A1 * | 10/2022 | Masci | G06T 7/269 |
| 2023/0228984 | A1 * | 7/2023 | Watson | G02B 21/0036 348/79 |

* cited by examiner

ENHANCED OPTICAL FLOW ESTIMATION USING A VARIED SCAN ORDER

RELATED APPLICATIONS

This application is a continuation of U.S. patent application Ser. No. 16/698,021, filed Nov. 27, 2019, which is incorporated herein by reference in its entirety.

BACKGROUND

Optical Flow (OF) estimation may be used as a building block for many graphics based applications, such as Advanced Driver-Assistance Systems (ADAS), Virtual reality (VR) applications, and Gaming. Thus, having high quality OF estimation is important to these applications functioning properly. An approach to OF estimation may use a hierarchical motion search, which starts from a coarse resolution level version of an image and continues to finer resolution level versions of the image to obtain an Optical Flow Estimate (OFE). Generally, at each resolution level of the hierarchical motion search, the image is scanned (typically starting from a top left location in the image), and subsequently analyzed in the same sequential order to determine OFEs. The OFEs may include motion vectors (MVs) for different locations in the image, such as pixels and/or macroblocks.

OF estimation may be implemented using a hint-based algorithm in which a scan of an image may determine an OFE for a location in the image using OFEs of neighboring locations as spatial hints. In particular, MVs of the neighboring locations may be used to determine an MV for the current location. However, at the outset of the hierarchical motion search, no spatial hints or few spatial hints may be available. This may result in the initial MVs of a scan at a resolution level being less accurate compared to later MVs in the scan. The less accurate MVs may impact OF estimation at other resolution levels, as it may be used for hints to determine OFEs of corresponding locations at the next resolution level. For example, the resulting OFEs for the top half of an image can be poor when the OF estimation scan at each resolution level starts with the top left corner of the image and scans columns from left to right and rows from top to bottom.

SUMMARY

Embodiments of the present disclosure relate to enhanced optical flow estimation using a varied scan order. Systems and methods are disclosed that can improve Optical Flow Estimate (OFE) quality when employing a hint-based algorithm.

In accordance with disclosed approaches, rather than using the same scan order at all times to determine OFEs, the scan order may be varied. For example, in embodiments that use a hierarchical motion search, the order of analysis or scanning may be different for different levels. Using disclosed approaches, a scan of an image may initially leverage OFEs from a previous scan of the image that are more likely to be of high accuracy (e.g., those for the bottom half of the image from a top to bottom scan) until sufficient spatial hints are available for the scan to reduce the impact of potentially lower quality OFEs from the previous scan (e.g., those for the top half of the image from a top to bottom scan).

BRIEF DESCRIPTION OF THE DRAWINGS

The present systems and methods for enhanced optical flow estimation using a varied scan order is described in detail below with reference to the attached drawing figures, wherein.

DETAILED DESCRIPTION

Figure 1A:
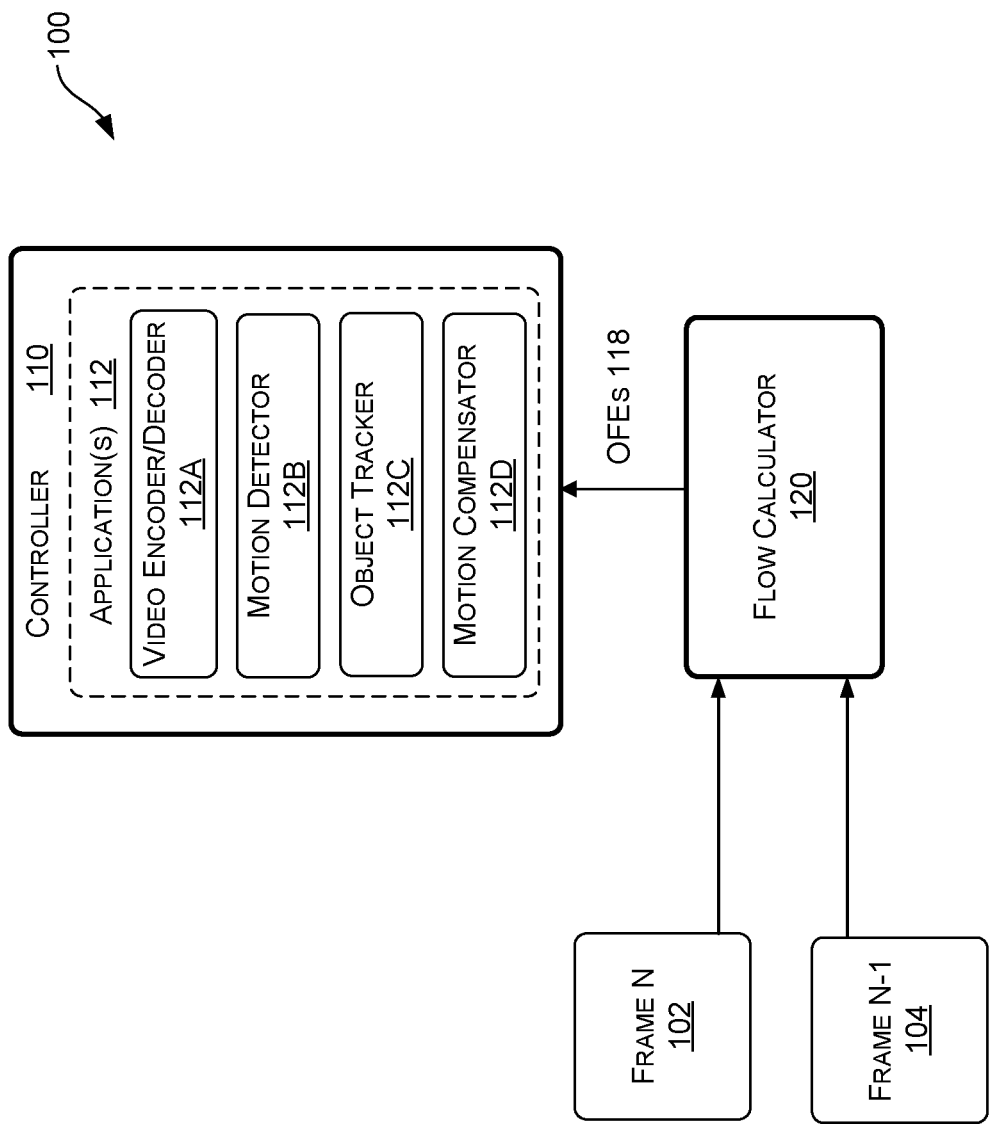
FIG. 1A is a functional block diagram illustrating an example of a system that may use optical flow estimation, in accordance with some embodiments of the present disclosure.

Systems and methods are disclosed related to enhanced optical flow estimation using a varied scan order. The present disclosure provides approaches for improving Optical Flow (OF) estimation quality when employing a hint-based algorithm. In contrast to conventional approaches, rather than using the same scan order at all times to determine Optical Flow Estimates (OFEs), the scan order may be varied. For example, in embodiments that use a hierarchical motion search, the order of analysis or scanning may be different for different levels. Using disclosed approaches, a scan of an image may initially leverage OFEs from a previous scan of the image that are more likely to be of high accuracy (e.g., those for the bottom half of the image from a top to bottom scan) until sufficient spatial hints are available for the scan to reduce the impact of potentially lower quality OFEs from the previous scan (e.g., those for the top half of the image from a top to bottom scan).

In at least one embodiment, a first version (e.g., first resolution level version) of an image may be analyzed using spatial hints and a first scan order and/or direction starting at the upper left hand corner of the image and proceeding through columns left to right and rows top to bottom. The OFEs from the first version of the image may be input to an analysis of a second version (e.g., a second resolution level version) of the image (e.g., at a finer level of resolution). Here, the image may be analyzed using spatial hints and a second scan order and/or direction (e.g., a reverse direction of the first scan order). For example, the image may be analyzed starting at the lower right hand corner of the image and proceeding through columns from right to left and rows from bottom to top. Using this approach, higher quality spatial hints may be available for locations toward the top of the image than would otherwise be available. This may improve OFEs for those locations by reducing the reliance on potentially lower quality OFEs from a previous scan.

One approach to OF estimation that may use disclosed techniques is a multi-level hierarchical motion search that scans a version of an image at multiple different levels of resolution, which may start from a coarse resolution level version of an image and continue to one or more finer resolution level versions of the image to obtain OFEs. At each level, to determine an OFE for a location in the image (e.g. a Macro-block (MB)) spatial hints from other locations of the image (e.g. OFEs from adjacent MBs) may be used. In addition, external hints (e.g. OFEs determined for a corresponding MB at a previous coarser level of the image) can also be used to determine the OFE for the location in the image for which an OFE is being determined.

In at least one embodiment, in order to reverse the direction of analysis, a representation of the image and/or previous optical flow results that are used for analysis can be rotated in memory (e.g., by 180 degrees) between scans and/or levels of a motion search (e.g., levels of a hierarchical motion search). In this example, the optical flow algorithm can maintain the same logical direction of analysis between scans and/or levels, but the effective direction of analysis with respect to the image is reversed by rotating underlying representations.

In at least one embodiment, in addition to, or instead of, changing a scan order between levels of a motion search (e.g., in a hierarchical motion search), a scan may be performed in a first order (e.g., a forward direction), and then performed in a second order (e.g., in a reverse direction), on the same version of the image (e.g., the order or direction may be changed one or more times). For example, the scan may include a first pass on the image using the first order, and a second pass on the image using the second order. The OFEs from the first and second passes and/or scan orders may be combined (e.g., averaged) to result in the OFEs for the version of the image and/or level of a motion search.

In some embodiments, each location of the version of the image may be scanned in the first pass and again in the second pass. In some embodiments, one or more different locations of the version of the image may be scanned in each pass. As an example, a first pass may scan odd locations and a second pass may scan even locations (or use some other scan pattern). In such examples, OFEs from different passes may not be combined to result in the OFEs for the version of the image.

With reference to FIG. 1A, FIG. 1A is a functional block diagram illustrating an example system 100 that may use optical flow estimation, in accordance with some embodiments of the present disclosure. In particular, the system 100 may use a flow calculator 120 that may use OF estimation (e.g., hierarchical motion estimation) to determine OFEs 118 (e.g., motion vectors (MVs)) for a frame N 102. The OFEs 118 determined by the flow calculator 120 can be used in a variety of applications, such as Advanced Driver-Assistance Systems (ADAS), Virtual reality (VR), and Gaming.

It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

In the example of FIG. 1A, the system 100 includes a controller 110, such as one or more processors or processes, that can implement one or more applications 112 that can use the OFEs 118 (e.g., MVs) determined by the flow calculator 120 from image data (e.g., video data). For example, image data representative of frames of a video may be applied to the flow calculator 120 including a frame N 102 and a frame N−1 104 for use by the flow calculator 120 in computing the OFEs 118 for the frame N 102. The frame N−1 104 may correspond to a frame that occurs temporally prior to the frame N 102 in the video, such as immediately prior to the frame N 102 or with one or more intervening frames. Further, the flow calculator 120 may similarly process any number of frames of the video (e.g., in sequence) to determine OFEs for those frames. While only the frame N−1 104 is shown, in other examples, any number of frames of a video may be used by the flow calculator 120 to compute the OFEs 118 for the frame N 102.

In the example of FIG. 1A, a video encoder or decoder 112A may use the OFEs 118 computed by the flow calculator 120 to encode and/or decode the video data. As a further example, a motion detector 112B may use the OFEs 118 computed by the flow calculator 120 to detect motion (e.g., inter-frame motion) represented in the video data. Additionally, an object tracker 112C may use the OFEs 118 computed by the flow calculator 120 to track an object represented in the video data. Also, a motion compensator 112D may use the OFEs 118 computed by the flow calculator 120 to compensate for motion (e.g., inter-frame motion) represented in the video data. The applications 112 are provided for purposes of example only and many other applications can use MVs and/or OFEs determined in accordance with the present disclosure.

Figure 1B:
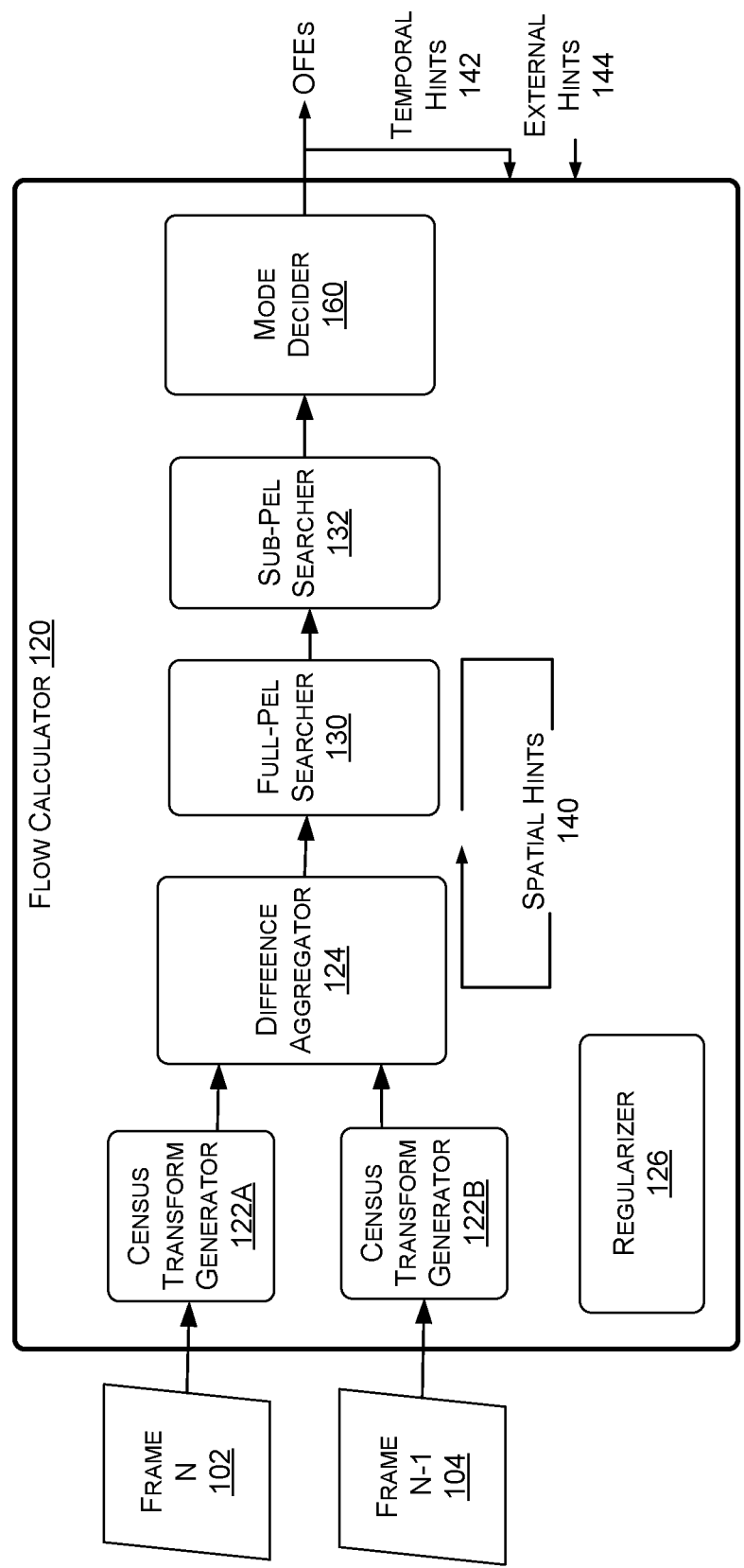
FIG. 1B is a functional block diagram illustrating one example of a flow calculator that may be used for optical flow estimation, in accordance with some embodiments of the present disclosure.

FIG. 1B is a functional block diagram illustrating one example of the flow calculator 120 that may be used for OF estimation, in accordance with some embodiments of the present disclosure. In the example shown, a census transform generator 122A may determine census transforms from image data representing the frame N 102 and a census transform generator 122B may determine census transforms from image data representing the frame N−1 104. In some embodiments, the flow calculator 120 may use a regularizer 126 to reduce the solution space of OFEs to a manageable level. For example, the regularizer 126 may perform regularization to remove noise by smoothing small variations in frames represented by the image data.

The census transforms of the frame N 102 and the frame N−1 104 may be input to a difference aggregator 124 of the flow calculator 120, as shown in FIG. 1B. The difference aggregator 124 may determine aggregated difference data representative of aggregated differences between the frame N 102 and the frame N−1 104. The aggregated difference data from the difference aggregator 124 may be input to a full-pel searcher 130 to compute OFEs between the frame N 102 and the frame N−1 104 at full-pel resolution. The OFEs at full-pel resolution may be provided to a sub-pel searcher 132, which may use those OFEs (MVs) to search for and determine OFEs (MVs) at sub-pel resolution. The use of the full-pel OFEs may allow for the sub-pel searcher 132 to find the sub-pel OFEs more precisely and easily. However, in other embodiments the flow calculator 120 may use a different approach to searching for OFEs. The flow calculator 120 may also use a mode decider 160, which may process the sub-pel OFEs to generate the OFEs 118 between the frame N 102 and the frame N−1 104. The mode decider 160 may be used in some embodiments to determine whether to disqualify one or more OFEs, for example, when OF estimation is unable to find a good match for a location (e.g., a MB). For example, when a block is on a boundary of an object represented in the image data, is in an occluded region of an object represented in the image data, and/or or is in a reappearance region object represented in the image data, it may be difficult to find a matched block from a previous frame. The mode decider 160 may decide for each location whether a good match was found and use the determination to adjust or flag those OFEs in the OFEs 118.

In computing the OFEs 118, the flow calculator 120 may leverage any of a variety of hints in order to search for OFEs. For example, the flow calculator 120 may use spatial hints 140, temporal hints 142, and/or external hints 144. A spatial hint that the flow calculator 120 uses to determine an OFE for a location in an image may correspond to an OFE of another location that is spatially contemporaneous with the location in the image. A temporal hint that the flow calculator 120 uses to determine an OFE for a location in an image may correspond to an OFE of a location that is historical to the image (e.g., an OFE for the frame N−1 104 and/or a different frame prior to the frame N 102 in the video). An external hint that the flow calculator 120 uses to determine an OFE for a location in an image may correspond to a result of forward-backward consistency checking of OFEs.

Figure 1C:
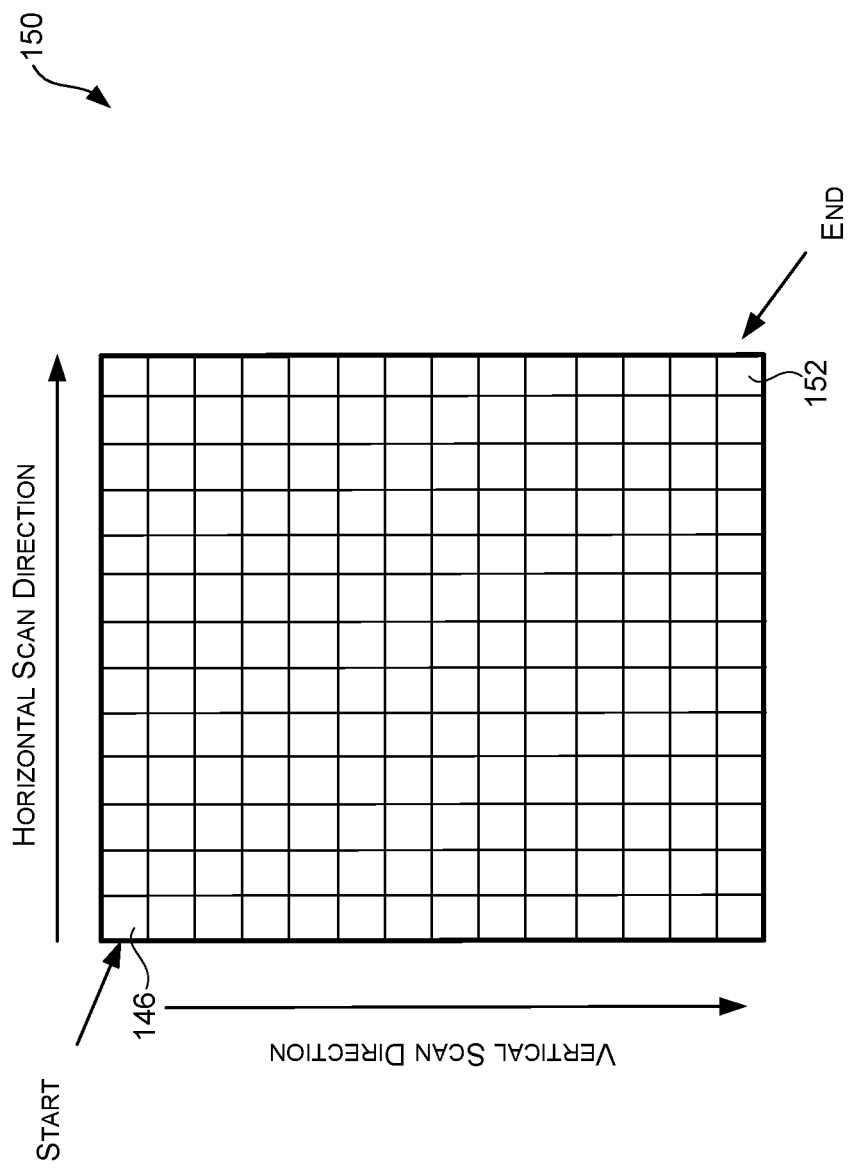
FIG. 1C is a schematic diagram that illustrates locations of an image and an example of a scan order of the locations, in accordance with some embodiments of the present disclosure.

FIG. 1C is a schematic diagram that illustrates locations of an image 150 and an example of a scan order of the locations, in accordance with some embodiments of the present disclosure. In this example, a scan may start with a location 146 (e.g. a MB), in an upper left hand corner of the image 150 and proceed in a left to right horizontal scan direction and top to bottom vertical scan direction to a location 148 in the lower right hand corner of the image 150.

For each location, the flow calculator 120 may compute an OFE. For example, the flow calculator 120 may compute an OFE for a location of the image 150 based at least in part on one or more spatial hints, which may correspond to OFEs for one or more other locations in the image 150 (e.g., based on a proximity of those other locations to the location). While many spatial hints may be available for the location 152 and other locations near the location 152 (because those locations are towards the end of the scan order), few to no spatial hints may be available for the location 146 and other locations near the location 146. Thus, low quality OFEs may result for the locations towards the start of the scan order (e.g., the top of the image 150 in the example shown).

In one or more embodiments, to determine an OFE for a location, the flow calculator 120 may use a hint (e.g., a previously determined OFE) to determine a location in the image 150 to search for a matching location for the OFE and/or a search pattern for the machine location. For example, an endpoint(s) of a MV(s) of a hint(s) may define a location(s) the flow calculator 120 uses to search for an endpoint of a MV for the location. In some embodiments, the flow calculator 120 uses a search pattern around each hint (e.g., a quad around an endpoint) to search for an endpoint of a MV for the location.

Figure 1D:
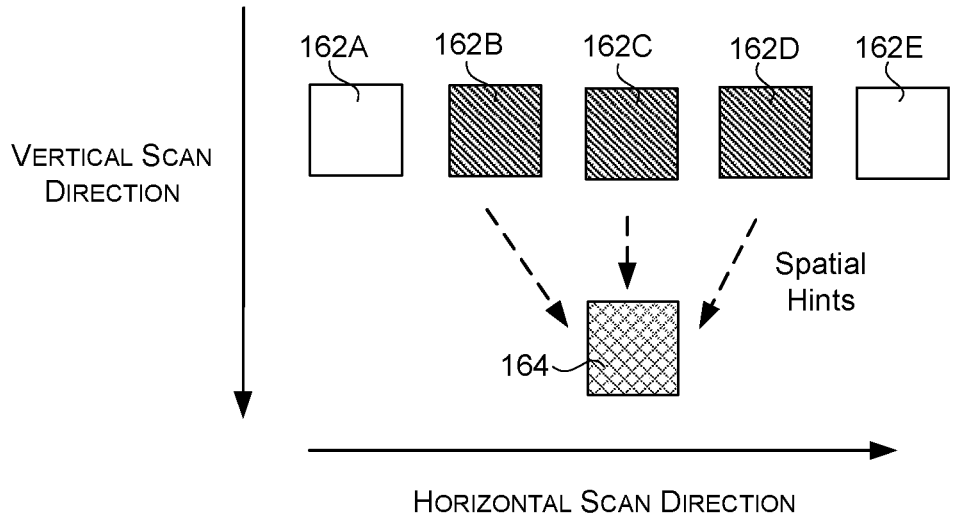
FIG. 1D is a schematic diagram illustrating an example of spatial hints that may be used for a location in the scan order illustrated in FIG. 1C, in accordance with some embodiments of the present disclosure.

FIG. 1D is a schematic diagram illustrating an example of spatial hints that may be used for a location in the scan order illustrated in FIG. 1C, in accordance with some embodiments of the present disclosure. In this example, locations 162A, 162B, 162C, 162D, and 162E may represent locations in a row above a location 164 in the image 150. The flow calculator 120 may use OFEs for locations 162B, 162C and 162D from the row above and to adjacent to the location 164 as spatial hints in determining an OFE for the location 164. For example, the locations 162B, 162C and 162D may be selected in a predetermined pattern relative to the location 164 to provide the spatial hints for the location 164. Thus, when an OFE is determined for the location next to the location 164 in the scan order, the locations 162C, 162D, and 162E may be selected in the predetermined pattern relative to the location to provide the spatial hints for that location.

In this example, locations along a top row of the image 150 will have no previous OFEs to leverage as spatial hints, which may result in lower quality OFEs for those locations. Further, when the scan order reaches the next row, these lower quality OFEs may be used as spatial hints for locations in that row. As the scan proceeds, the quality and/or reliability of the spatial hints may improve toward locations near the end of the scan order. The scan order and selection of spatial hints is provided as an example, but other scan orders and/or selection criteria for spatial hints may be used in various embodiments.

Figure 1E:
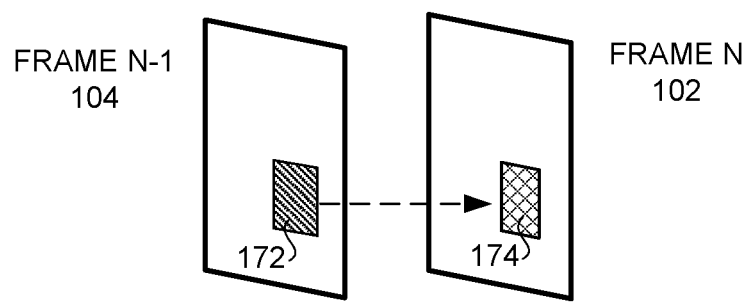
FIG. 1E is a schematic diagram illustrating an example of a temporal hint that may be used for a location in the scan order illustrated in FIG. 1C, in accordance with some embodiments of the present disclosure.

FIG. 1E is a schematic diagram illustrating an example of a temporal hint that may be used for a location in the scan order illustrated in FIG. 1C, in accordance with some embodiments of the present disclosure. As indicated, the flow calculator 120 may use an OFE for a location 172 that was previously determined for the frame N−1 104 as a temporal hint for a location 174 to determine an OFE for the location 174. The location 172 may be selected by the flow calculator 120 based at least in part on its location relative to the location 172. Further, any number of locations for the frame N−1 104 may be used to provide any number of temporal hints for the location 174. Also, in some embodiments, the flow calculator 120 may not use temporal hints.

Figure 1F:
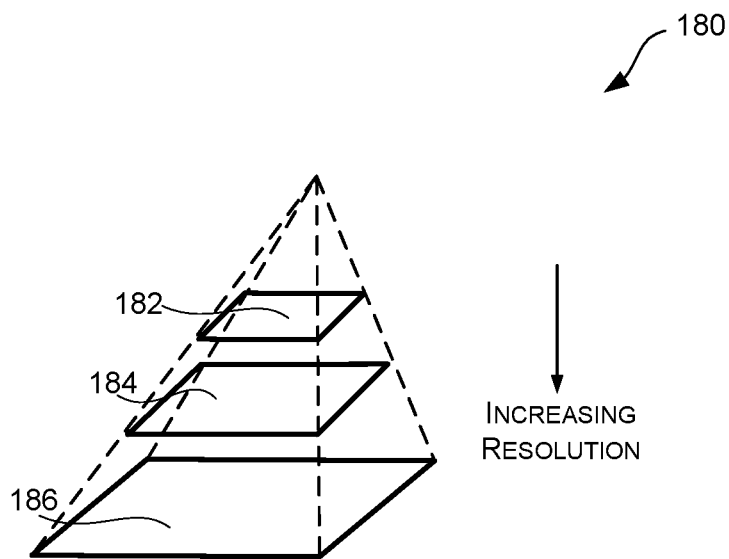
FIG. 1F is a schematic diagram illustrating an example of multiple levels or versions of an image that may be used in a hierarchical motion search, in accordance with some embodiments of the present disclosure.

FIG. 1F is a schematic diagram illustrating an example of multiple levels or versions of an image that may be used in a hierarchical motion search 180, in accordance with some embodiments of the present disclosure. A hierarchical motion search may include at least two levels, but in the example shown includes levels 182, 184, and 186. The image 150 of FIG. 1C may correspond to one of the levels of FIG. 1F. In this example, OFEs may be first determined at a level 182 having relatively coarse resolution. For example, assuming the image 150 corresponds to the level 182, the OFEs may be determined using the scan order described with respect to FIG. 1C. OFEs may then be determined at a level 184 having a resolution that is greater than that of the level 182. In doing so, the flow calculator 120 may use one or more of the OFEs from the level 182 as external hints.

Figure 1G:
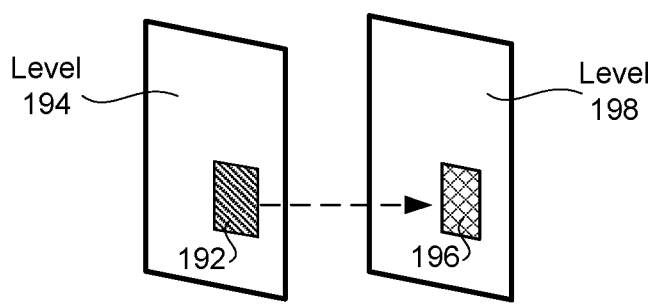
FIG. 1G is a schematic diagram illustrating one example of the use of an OFE from a coarser level in the determination of an OFE at a higher resolution level in the example of FIG. 1F, in accordance with some embodiments of the present disclosure.

For example, FIG. 1G is a schematic diagram illustrating an example of an external hint that may be used for a location in the scan order illustrated in FIG. 1C, in accordance with some embodiments of the present disclosure. As indicated, the flow calculator 120 may use an OFE for a location 192 that was previously determined for a level 194 as a temporal hint for a location 196 of a level 198 to determine an OFE for the location 196. The location 192 may be selected by the flow calculator 120 based at least in part on its location relative to the location 196. Further, any number of locations for the level 194 may be used to provide any number of external hints for the location 196. Also, in some embodiments, the flow calculator 120 may not use external hints.

Thus, the level 194 of FIG. 1G may correspond to the level 182 and the level 184 may correspond to the level 198 when determining OFEs for the level 184. Next, OFEs may be determined at a level 186 having a resolution that is greater than that of the level 184. In doing so, the flow calculator 120 may use one or more of the OFEs from the level 184 as external hints. Thus, the level 194 of FIG. 1G may correspond to the level 184 and the level 186 may correspond to the level 198 when determining OFEs for the level 186.

Assume the image 150 of FIG. 1C corresponds to the level 182 of FIG. 1F, such that the OFEs are determined using the scan order described with respect to FIG. 1C. As described herein, low quality OFEs may result for locations towards the start of the scan order (e.g., the top of the image 150 in the example shown). If, for example, OFEs are also determined for the level 184 of FIG. 1F using the scan order described with respect to FIG. 1C, the potentially low quality OFEs from the level 182 may be used as external hints for corresponding locations in the level 184. Further, similar to the level 182, few to no spatial hints may be available for the locations near the start of the scan of the level 184. As such, low quality OFEs are also more likely to result for the level 194 at locations towards the start of the scan order (e.g., the top of the version of image or frame). A similar situation may occur when determining OFEs for the level 186 if the same scan order is maintained.

As described herein, and in contrast to conventional systems, the present disclosure provides for using different scan orders for OF estimation for different levels, for different image versions, and/or for different passes of scans used to determiner OFEs for a frame. This approach may improve the quality of OFEs determined for locations in an image by improving the overall hint quality available for determining the OFEs. As mentioned, if for example, OFEs are also determined for the level 184 of FIG. 1F using the scan order described with respect to FIG. 1C, the potentially low quality OFEs from the level 182 may be used as external hints for corresponding locations in the level 184. Further, similar to the level 182, few to no spatial hints may be available for the locations near the start of the scan of the level 184. However, if OFEs are determined for the level 184 of FIG. 1F using a different scan order described with respect to FIG. 1C, high or higher quality spatial hints may be available for those locations to account for the potentially low quality external hints. This may result in higher quality OFEs for the level 184, and therefore higher quality external hints to the level 186 in embodiments where additional levels are used.

Figure 2A:
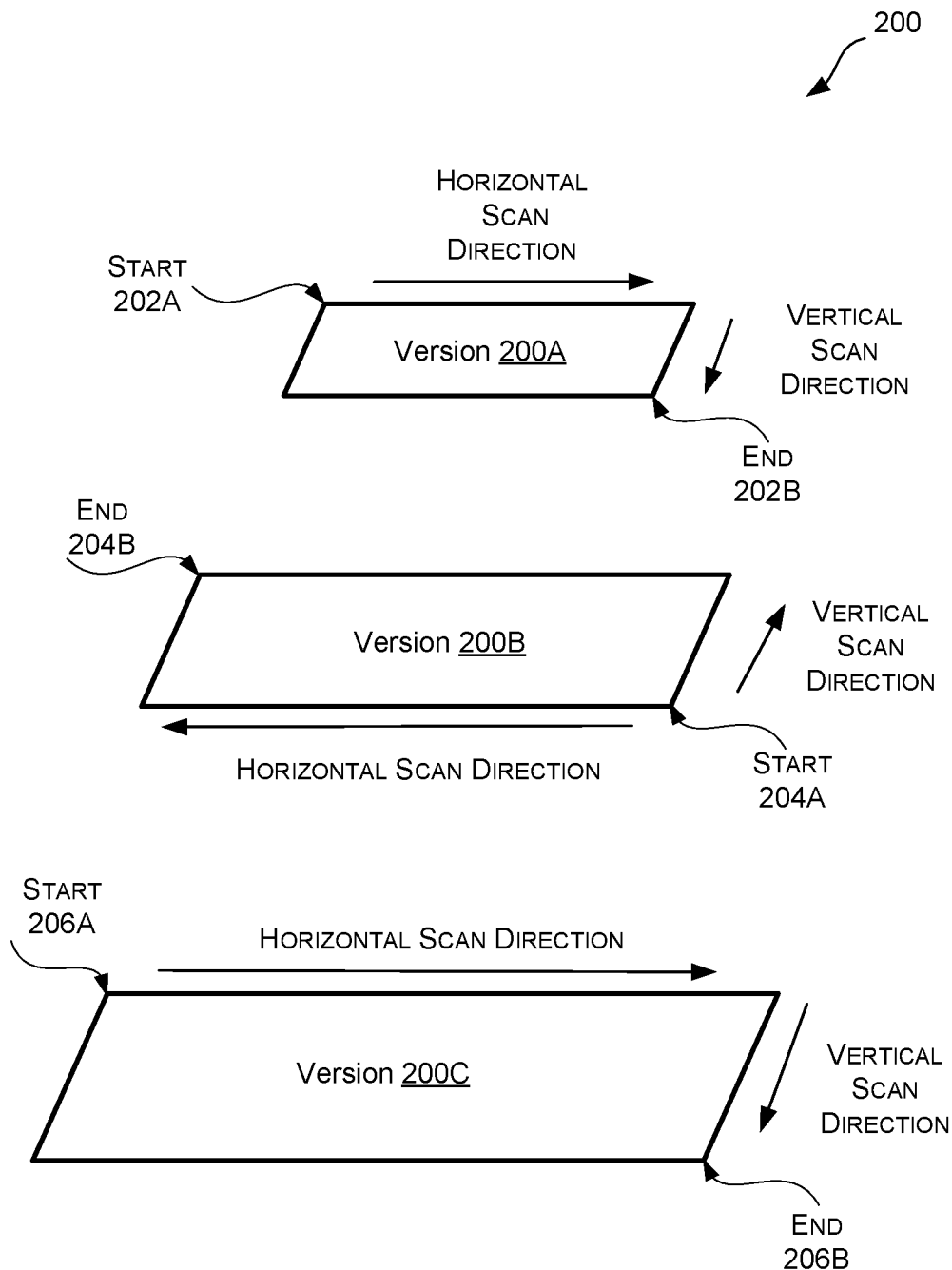
FIG. 2A is a schematic diagram illustrating scan orders in versions of an image, in accordance with some embodiments of the present disclosure.

FIG. 2A is used to illustrate examples of using different scan orders for different levels, for different image versions, and/or for different passes of scans used to determiner OFEs for a frame. FIG. 2A is a schematic diagram illustrating scan orders in three versions 200 of an image, which may correspond to levels 182, 184, and 186 of FIG. 1F. For a version 200A (e.g. at a coarse level of resolution) a scan to determine OFEs may start at a location in an upper left hand corner 202A of the version 200A with a horizontal scan direction from left to right and a vertical scan direction from top to bottom ending at a location in a lower right hand corner 202B of the version 200A (e.g., similar to the scan order of FIG. 1C). Thus, the OFEs determined for locations at the top portion of the version 200A may be of lower quality than the OFEs determined for locations at the bottom portion of the version 200A due to the availability of spatial hints (e.g., generated from earlier rows during the same scan pass) available to the bottom portion of the version 200A.

For a version 200B (e.g. at a finer level of resolution than the version 200A), a scan to determine OFEs may use a different order than that used for the version 200A. For example, the scan may start at a location in a lower right hand corner 204A of the version 200B with a horizontal scan direction from right to left and a vertical scan direction from bottom to top ending at a location in an upper left hand corner 204B of the version 200B (e.g., an inverted scan order from the scan order of FIG. 1C).

Thus, alternating scan orders may be used with the versions 200A and 200B, with the scan order for version 200B being inverted or reversed from the scan order of version 200A. The quality of the OFEs determined for locations at the bottom portion of the version 200B may benefit from the corresponding OFEs determined for the locations in the version 200A, which may be used as external hints in the OF estimation. Further, the quality of the OFEs determined for locations at the top portion of the version 200B may benefit from the nearby OFEs determined for the locations in the version 200B, which may be used as spatial hints in the OF estimation. Thus, the overall quality of the OFEs determined by scanning the version 200B may be improved compared to using the same scan order for each pass and/or version. Fewer or more than three versions may be used with varying scan orders in accordance with embodiments of the disclosure.

For a version 200C (e.g. at a still finer level of resolution than the version 200B), a scan to determine OFEs may use a different order than used for the version 200B, e.g. the same order as was used for version 200A. For example, the scan may start at a location in an upper left hand corner 206A of the version 200C with a horizontal scan direction from left to right and a vertical scan direction from top to bottom ending at a location in a lower right hand corner 206B of the version 200C (e.g., similar to the scan order of FIG. 1C). Thus, alternating scan orders may be used with the versions 200A and 200C sharing the same scan order and version 200B using a different scan order.

However in other embodiments different or non-alternating scan orders may be used. The quality of the OFEs determined for locations at the top portion of the version 200C may benefit from the corresponding OFEs determined for the locations in the version 200B, which may be used as external hints in the OF estimation. Further, the quality of the OFEs determined for locations at the bottom portion of the version 200C may benefit from the nearby OFEs determined for the locations in the version 200C, which may be used as spatial hints in the OF estimation. Thus, the overall quality of the OFEs determined by scanning the version 200 may be improved compared to using the same scan order for each pass and/or version. Fewer or more than three versions may be used with varying scan orders in accordance with embodiments of the disclosure.

In at least one embodiment, in order to reverse the direction of analysis, a representation of the image and/or previous optical flow results that are used for analysis can be rotated in memory (e.g., by 180 degrees) between scans, passes, and/or levels of a motion search (e.g., levels of a hierarchical motion search). In some embodiments, this may be used to allow the optical flow algorithm to use the same logic for determining the order of locations to scan and/or for determining OFEs for different scans, passes, and/or levels of a motion search. For example, the same logical direction of analysis may be used between scans, passes, and/or levels, but the effective direction of analysis may be reversed by rotating underlying representations. This may be useful to simplify design of the logic and/or account for embodiments where the logic is implemented in hardware or firmware.

Figure 2B:
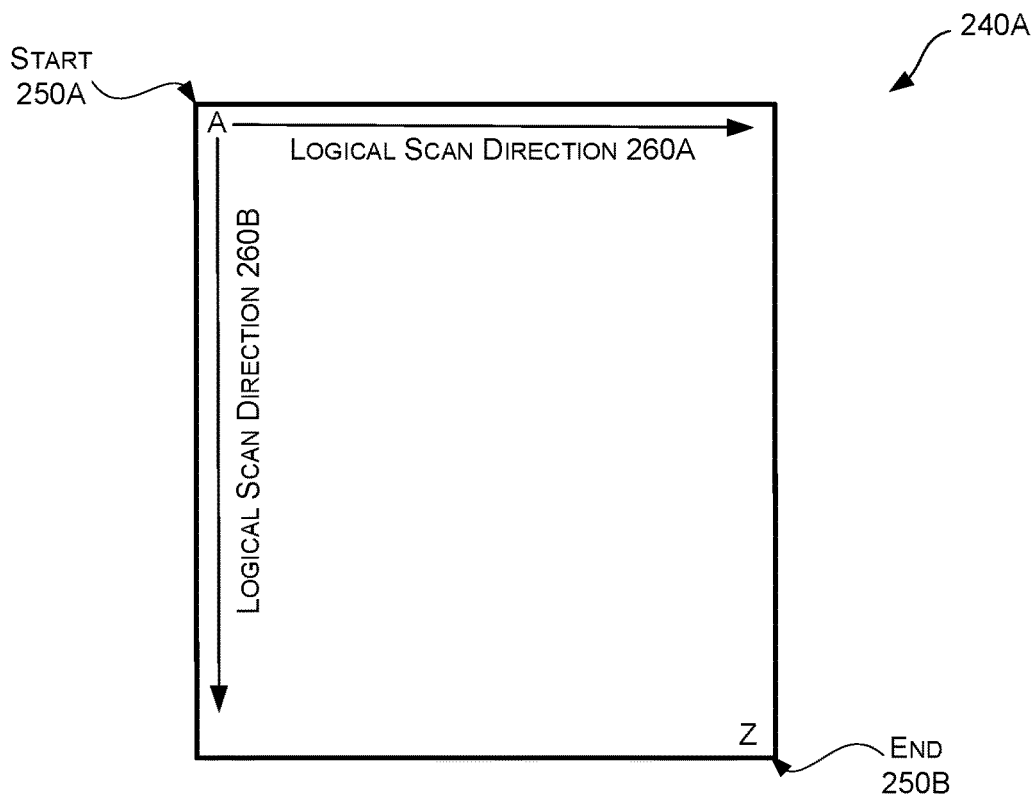
FIG. 2B is a schematic diagram illustrating an example of a first orientation of locations of an image in memory, in accordance with some embodiments of the present disclosure.
Figure 2C:
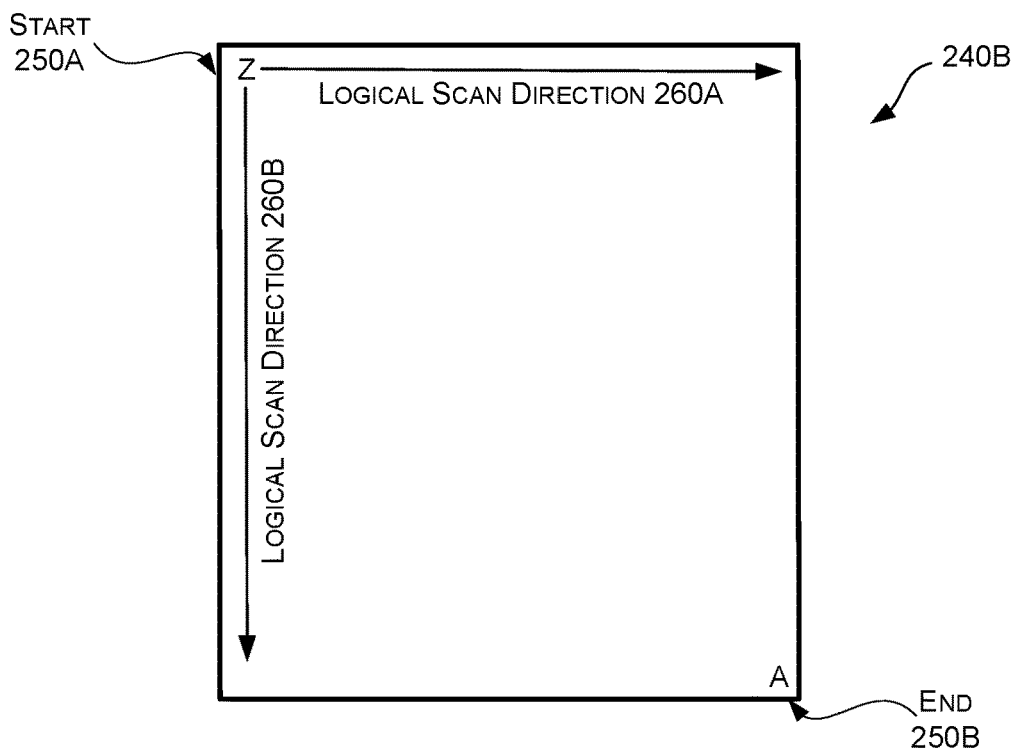
FIG. 2C is a schematic diagram illustrating an example of a second orientation of locations of the image of FIG. 2B in memory, in accordance with some embodiments of the present disclosure.

FIG. 2B is a schematic diagram illustrating an example of an orientation 240A of locations of an image in memory, in accordance with some embodiments of the present disclosure and FIG. 2C is a schematic diagram illustrating an example of an orientation 240B of locations of the image of FIG. 2B in memory, in accordance with some embodiments of the present disclosure.

In this example, the orientation 240B of FIG. 2C is rotated 180 degrees relative to the orientation 240A of FIG. 2B. The orientation 240A may be used for the version 200A of FIG. 2A, the orientation 240B may be used for the version 200B of FIG. 2A, then the orientation 240A may be used again for the version 200C of FIG. 2A. In each case, the memory may be scanned at starting at a location in an upper left hand corner 250A and proceeding in a horizontal logical scan direction 260A from left to right and a vertical logical scan direction 260B from top to bottom and ending in a lower right hand corner 250B. While the logical scan order used by the flow calculator 120 is the same, the effective scan order is reversed.

In at least one embodiment, in addition to or instead of changing a scan order between levels of a motion search (e.g., in a hierarchical motion search), a scan may be performed in a first order (e.g., a forward direction), and then performed in a second order (e.g., in a reverse direction), on the same version of the image (e.g., the order or direction may be changed one or more times). For example, the scan may include a first pass on the image using the first order, and a second pass on the image using the second order. The OFEs from the first and second passes and/or scan orders may be combined (e.g., averaged) to result in the OFEs for the version of the image and/or level of a motion search. This approach may be used for one or more levels of a hierarchical motion search and/or for embodiments that do not use a hierarchical motion search. Referring to version 200A of FIG. 2A as an example, a first pass of a scan may be performed on the version 200A in the effective scan order corresponding to FIG. 2B to determine a first set of OFEs.

A second pass of the scan may be performed on the version 200A in the effective scan order corresponding to FIG. 2C to determine a second set of OFEs. The OFEs from the first and second passes may be averaged or otherwise combined to obtain the OFEs for the version 200A. In addition or instead, the second pass may use OFEs from the first set of OFEs as spatial hints for determining the OFES of the second set of OFEs (e.g., an OFE for a location may be determined using one or more OFEs as a hint, which may or may not include an OFE determined for that location in a previous pass). In some embodiments, one or more different locations of the version of the image may be scanned in each pass. As an example, a first pass may scan odd locations and a second pass may scan even locations (or use some other scan pattern). In such examples, OFEs from different passes may collectively form the OFEs for the version of the image, and/or the first set of OFEs from the first pass may be used as spatial hints for the second pass.

Figure 3:
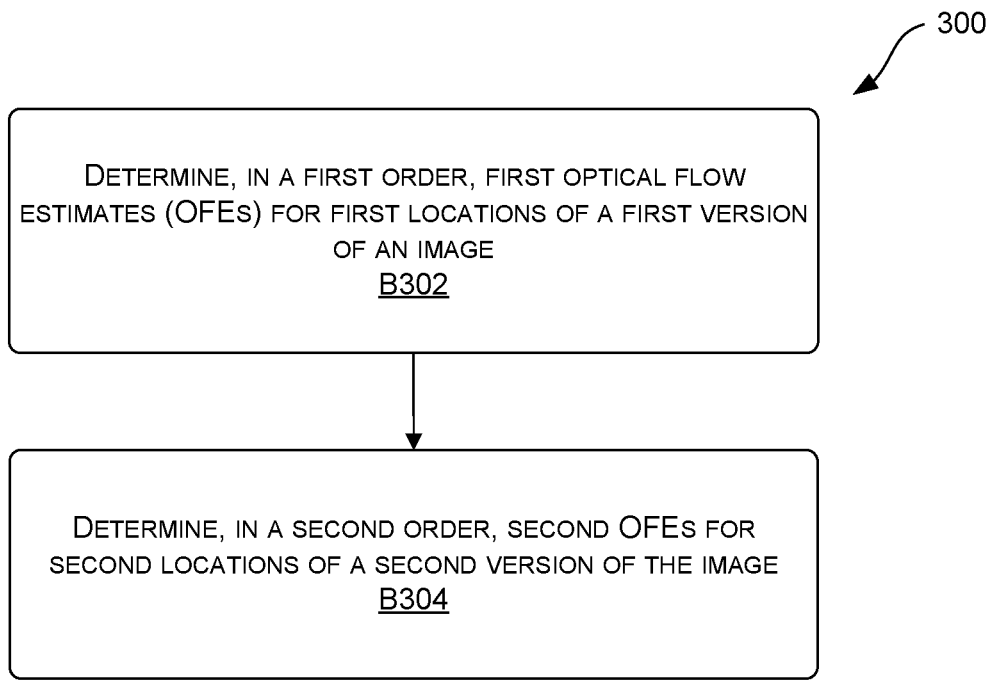
FIG. 3 is a flow diagram showing a method for motion estimation of an image in which OFEs for different versions of the image are determined in different orders, in accordance with some embodiments of the present disclosure.
Figure 4:
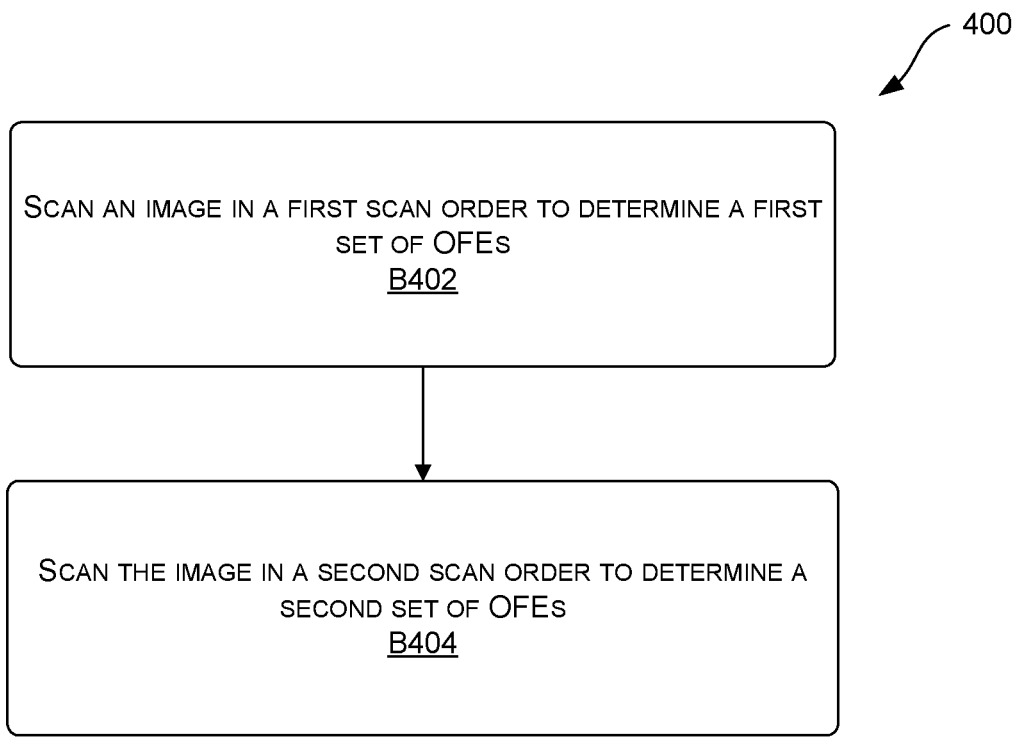
FIG. 4 is a flow diagram showing a method for motion estimation of an image in which OFEs for different scans of the image use different scan orders, in accordance with some embodiments of the present disclosure.
Figure 5:
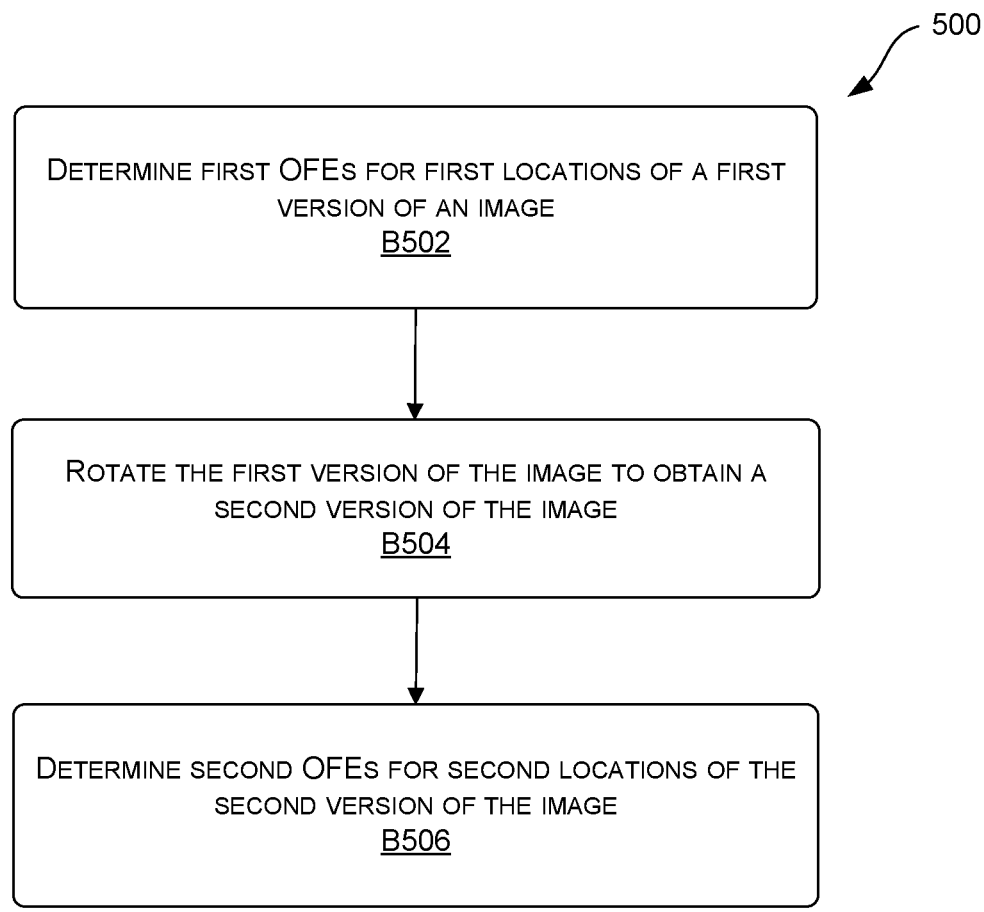
FIG. 5 is a flow diagram showing a method for modifying the effective scan order of an image in motion estimation, in accordance with some embodiments of the present disclosure.

Now referring to FIGS. 3, 4 and 5, each block of methods 300, 400 and 500, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, the methods 300, 400, and 500 may be described, by way of example, with respect to the system 100 of FIGS. 1A and 1B. However, methods described herein may additionally or alternatively be executed by any one system, or any combination of systems, including, but not limited to, those described herein.

FIG. 3 is a flow diagram showing a method 300 for motion estimation of an image in which OFEs for different versions of the image are determined in different orders, in accordance with some embodiments of the present disclosure. The method 300, at block B302, determining, in a first order, first optical flow estimates (OFEs) for first locations of a first version of an image. For example, the flow calculator 120 may determine, in a first order, a first set of OFEs for MBs of the version 200A of an image corresponding to FIG. 2A, where at least some of the OFEs in the first set of OFEs are based on OFEs for adjacent MBs (e.g., using those OFEs as spatial hints).

The method 300, at block B304, includes determining, in a second order, second OFEs for second locations of a second version of the image. For example, the flow calculator 120 may determine, in a second order, a second set of OFEs for MBs of the version 200B of the image corresponding to FIG. 2A, where some OFEs in the second set of OFEs are based on OFEs for one or more adjacent MBs in the version 200B of the image (e.g., a spatial hint) as well as at least one OFE from the first set of OFEs for a corresponding MB in the version 200A of the image (e.g., an external hint). In some embodiments, the method 300 may continue using additional versions and/or levels for the motion estimation, such as the version 200C.

FIG. 4 is a flow diagram showing a method 400 for motion estimation of an image in which OFEs for different scans of the image use different scan orders, in accordance with some embodiments of the present disclosure. The method 400, at block B402, includes scanning an image in a first scan order to determine a first set of OFEs. For example, the flow calculator 120 may scan an image to determine first optical flow estimates (OFEs) of the image in a first order by scanning the version 200A of the image corresponding to FIG. 2A. A first OFE of the first OFEs may be based at least in part on at least second OFE of the first OFEs (e.g., the OFE as a spatial hint).

The method 400, at block B404, includes scanning the image in a second scan order to determine a second set of OFEs. For example, the flow calculator 120 may scan the image to determine second OFEs of the image in a second order by scanning the version 200B of the image corresponding to FIG. 2A. Some OFEs in the second set of OFEs may be determined using OFEs for adjacent MBs as spatial hints and use a corresponding OFE from the first set of OFEs as an external hint in the OF estimation. In some embodiments, the method 400 may continue using additional versions and/or levels for the motion estimation, such as the version 200C.

FIG. 5 is a flow diagram showing a method 500 for modifying the effective scan order of an image in motion estimation, in accordance with still other embodiments of the present disclosure. The method 500, at block B502, includes determining first OFEs for first locations of a first version of an image. For example, the flow calculator 120 may determine the first set of OFEs for MBs in the version 200A of the image corresponding to FIG. 2A, where some OFEs in the first set of OFEs may be determined using OFEs for adjacent MBs in the version 200A of the image as spatial hints in the OF estimation.

The method 500, at block B504, includes rotating the first version of the image to obtain a second version of the image. For example, the system 100 may rotate the version 200B of the image corresponding to FIG. 2A in memory relative to the version 200A. In one example, using the example of FIG. 1C, rotation can involve rewriting the image data in an image buffer in memory by scanning the image data starting with a memory address for the lower right hand location 152 and proceeding through memory addresses from right to left and bottom to top to obtain image data that is rotated by 180°. In another example, a start pointer to the beginning of the image data to be processed can be reset to point to a memory address corresponding to the lower right hand location 152 and the order in which memory addresses are scanned is reversed to proceed right to left and top to bottom. It will be readily appreciated that many approaches that effectively rotate the image data can be utilized in accordance with the disclosure.

The method 500, at block B506, includes determining second OFEs for second locations of the second version of the image. For example, the flow calculator 120 may determine the second set of OFEs for MBs of the version 220B of the image corresponding to FIG. 2A by scanning the memory, where some OFEs in the second set of OFEs may be determined using OFEs for adjacent MBs in the version 200B of the image as spatial hints in the OF estimation. In some examples, some OFEs in the second set of OFEs may be determined using a corresponding OFE from the first set of OFEs as an external hint in the OF estimation. In some embodiments, the method 500 may continue using additional versions and/or levels for the motion estimation, such as the version 200C.

Figure 6:
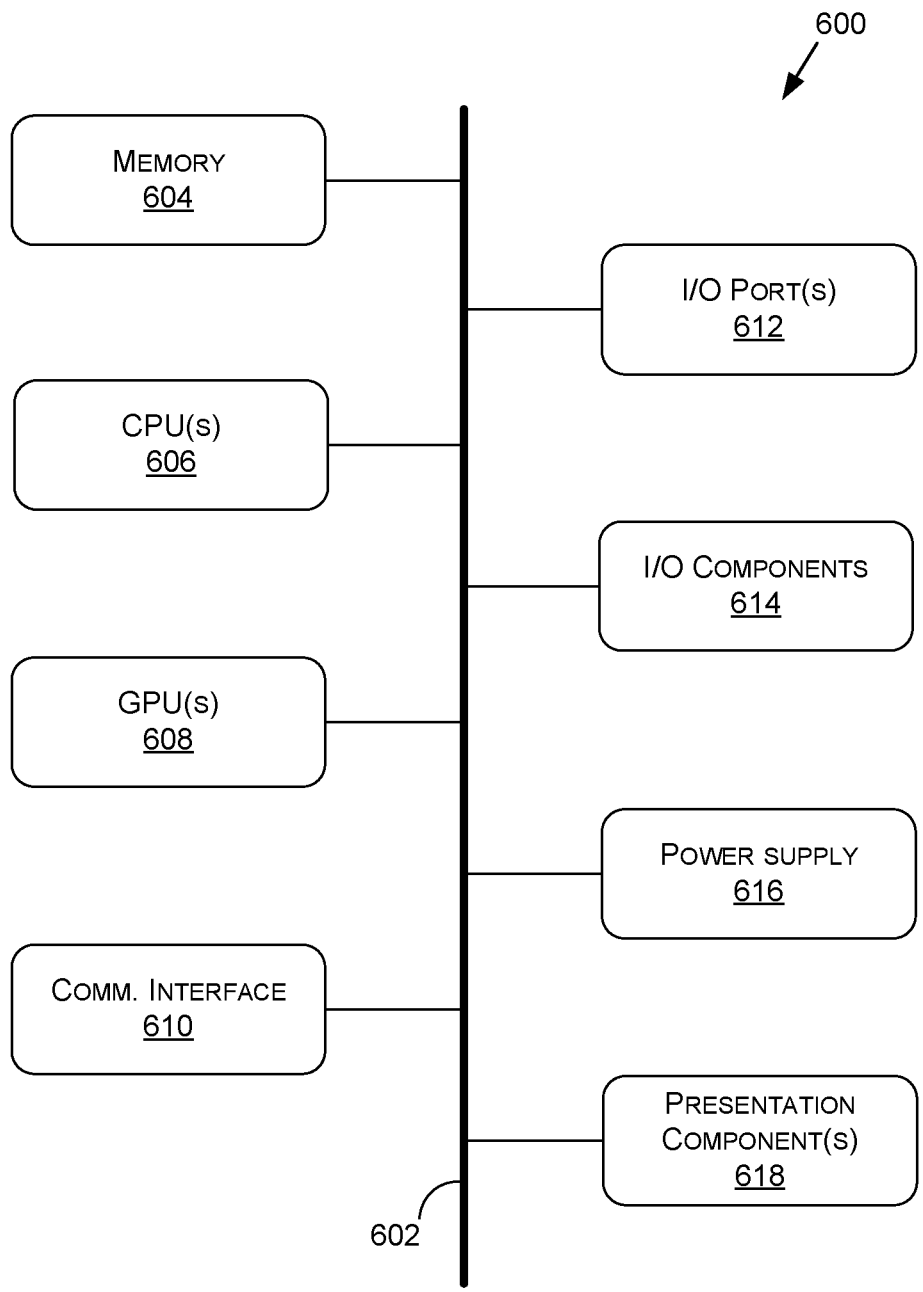
FIG. 6 is a block diagram of an example computing device suitable for use in implementing some embodiments of the present disclosure.

FIG. 6 is a block diagram of an example computing device 600 suitable for use in implementing some embodiments of the present disclosure. Computing device 600 may include a bus 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, and one or more presentation components 618 (e.g., display(s)).

Although the various blocks of FIG. 6 are shown as connected via the bus 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "handheld device," "game console," "electronic control unit (ECU)," "virtual reality system," and/or other device or system types, as all are contemplated within the scope of the computing device of FIG. 6.

The bus 602 may represent one or more busses, such as an address bus, a data bus, a control bus, or a combination thereof. The bus 602 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 606 may be configured to execute the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an ARM processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

The GPU(s) 608 may be used by the computing device 600 to render graphics (e.g., 3D graphics). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data. The display memory may be included as part of the memory 604. The GPU(s) 708 may include two or more GPUs operating in parallel (e.g., via a link). When combined together, each GPU 608 may generate pixel data for different portions of an output image or for different output images (e.g., a first GPU for a first image and a second GPU for a second image). Each GPU may include its own memory, or may share memory with other GPUs.

In examples where the computing device 600 does not include the GPU(s) 608, the CPU(s) 606 may be used to render graphics.

The communication interface 610 may include one or more receivers, transmitters, and/or transceivers that enable the computing device 700 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including handheld devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
performing a first scan of an image to determine a first set of optical flow estimates (OFEs) of the image;
performing a second scan of the image to determine a second set of OFEs of the image; and
computing a third set of OFEs of the image based at least on combining OFEs from the first set of OFEs and the second set of OFEs, wherein at least one OFE in the third set of OFEs is generated based at least on combining one or more first OFEs corresponding to a location in the image in the first set of OFEs with one or more second OFEs corresponding to the location in the second set of OFEs to assign the at least one OFE to the location and to produce the at least one OFE that is different from the one or more first OFEs and the one or more second OFEs.

2. The method of claim 1, wherein an OFE of the at least one OFE assigned to the location corresponds to an average of the one or more first OFEs and the one or more second OFEs.

3. The method of claim 1, wherein the second set of OFEs are determined using at least one OFE from the first set of OFEs as a spatial hint.

4. The method of claim 1, wherein the first scan is performed in a first order and the second scan of the image is performed in a second order that is different from the first order.

5. The method of claim 1, wherein the third set of OFEs correspond to a first version of the image, and the method further includes performing a third scan of a second version of the image to determine a fourth set of OFEs of the image using at least one OFE from the third set of OFEs as a spatial hint.

6. The method of claim 1, wherein the first scan is performed in a different order than the second scan based at least on locations corresponding to the image being rotated in memory for the second scan relative to the first scan.

7. The method of claim 1, wherein the first scan is performed using a first scan pattern that is different than a second scan pattern used in the second scan.

8. The method of claim 1, further comprising providing the third set of OFEs to at least one of an advanced driver-assistance system (ADAS) application, a virtual reality (VR) application, or a gaming application to detect motion of one or more objects represented in video data.

9. A system comprising:
one or more processors to execute operations comprising:
computing a set of Optical Flow Estimates (OFEs) of a first version of an image based at least on OFEs from at least two sets of reference OFEs computed from at least two image scans, the at least two image scans using different scan orders; and
computing a new set of OFEs from another image scan of a second version of the image using at least one OFE from the set of OFEs as a spatial hint.

10. The system of claim 9, wherein the computing includes averaging groups of OFEs from the at least two sets of reference OFEs.

11. The system of claim 9, wherein a first OFE from a first scan of the at least two image scans in the at least two sets of reference OFEs is determined using a second OFE from a second scan of the at least two image scans in the at least two sets of reference OFEs as a second spatial hint.

12. The system of claim 9, wherein a first scan of the at least two image scans is performed in a first scan order and a second scan of the at least two image scans is performed in a second scan order that is different from the first scan order.

13. The system of claim 9, wherein the operations further include computing a second new set of OFEs from another image scan of a third version of the image using one or more OFEs from the new set of OFEs as a second spatial hint.

14. The system of claim 9, wherein a first scan of the at least two image scans is performed in a different order than a second scan of the at least two image scans based at least on locations corresponding to the image being rotated in memory.

15. The system of claim 9, wherein t a first scan of the at least two image scans is performed using a first scan pattern that is different than a second scan pattern used in a second scan of the at least two image scans.

16. The system of claim 9, further comprising providing the new set of OFEs to at least one of an advanced driver-assistance system (ADAS) application, a virtual reality (VR) application, or a gaming application to detect motion of one or more objects represented in video data.

17. A processor comprising:
one or more circuits to compute a set of optical flow estimates (OFEs) of an image based at least on OFEs from at least two sets of reference OFEs computed from at least two image scans, the at least two image scans using different scan orders, wherein a first scan of the at least two image scans is performed in a different order than a second scan of the at least two image scans based at least on locations corresponding to the image being rotated in memory for the second scan relative to the first scan.

18. The processor of claim 17, wherein the set of OFEs are computed as a statistical combination of one or more OFEs from each of the at least two sets of reference OFEs.

19. The processor of claim 17, wherein a first OFE from a first scan of the at least two image scans in the at least two sets of reference OFEs is determined using a second OFE from a second scan of the at least two image scans in the at least two sets of reference OFEs as a spatial hint.

20. The processor of claim 17, wherein a first scan of the at least two image scans is performed using a first scan order of the image and a second scan of the at least two image scans is performed using a second scan order of the image that is different from the first scan order.

* * * * *